(12) United States Patent
Reiser

(10) Patent No.: US 7,732,073 B2
(45) Date of Patent: Jun. 8, 2010

(54) FUEL CELL MINIMUM FUEL RECYCLE WITH MAXIMUM FUEL UTILIZATION

(75) Inventor: Carl A. Reiser, Stonington, CT (US)

(73) Assignee: UTC Power Corporation, South Windsor, CT (US)

( * ) Notice: Subject to any disclaimer, the term of this patent is extended or adjusted under 35 U.S.C. 154(b) by 1121 days.

(21) Appl. No.: 10/838,816

(22) Filed: May 4, 2004

(65) Prior Publication Data
US 2005/0249990 A1 Nov. 10, 2005

(51) Int. Cl.
*H01M 8/04* (2006.01)
(52) U.S. Cl. .............................. 429/12; 429/13; 429/39
(58) Field of Classification Search ............. 429/13–17; 700/286–292
See application file for complete search history.

(56) References Cited

U.S. PATENT DOCUMENTS

| | | | |
|---|---|---|---|
| 3,615,850 A * | 10/1971 | Chludzinski et al. | 429/17 |
| 5,047,298 A * | 9/1991 | Perry et al. | 429/17 |
| 5,976,724 A * | 11/1999 | Bloomfield | 429/21 |
| 6,013,385 A | 1/2000 | DuBose | |
| 6,074,461 A * | 6/2000 | Wilson | 96/102 |
| 6,984,464 B2 * | 1/2006 | Margiott et al. | 429/12 |
| 6,994,929 B2 * | 2/2006 | Barbir et al. | 429/17 |
| 2002/0022171 A1 * | 2/2002 | Saito et al. | 429/34 |
| 2003/0180599 A1 * | 9/2003 | Kamihara | 429/34 |
| 2004/0241511 A1 * | 12/2004 | Kamihara et al. | 429/22 |

FOREIGN PATENT DOCUMENTS

WO WO03/107463 A2 * 12/2003

OTHER PUBLICATIONS

U.S. Appl. No. 10/765,735, filed Jan. 27, 2004.
U.S. Appl. No. 10/802,017, filed Mar. 16, 2004.

* cited by examiner

*Primary Examiner*—Patrick Ryan
*Assistant Examiner*—Alix Echelmeyer
(74) *Attorney, Agent, or Firm*—M. P. Williams

(57) ABSTRACT

Recycle fuel gas is provided (36) to an impeller (34, 34a) for application to the input (24) of the anode flow fields of a fuel cell stack (25). The impeller may be an ejector (34) having its primary input (33) connected to a source (11) of hydrogen and its secondary input (35) connected to the outlet (27, 37) of the fuel cells anode flow fields. The ejector outlet provides the minimum fuel flow required at the lowest power rating. The impeller may be an electrochemical hydrogen pump (34a) with a constant current generator (50) providing for a substantially constant recycle flow (the highest not more than double the lowest), and one pressure regulator (20) providing minimum flow of fresh fuel to the fuel inlets of the first stack. Pressure regulators (20, 21) control the amount of fresh fuel to the anode flow fields for power in excess of minimum power.

14 Claims, 4 Drawing Sheets

FIG.2 APROX. MOLES OF FUEL FLOW/CONSUMPTION/UTILIZATION AT 100% RATED POWER (5% RATED POWER)

FUEL CELL MINIMUM FUEL RECYCLE WITH MAXIMUM FUEL UTILIZATION

TECHNICAL FIELD

This invention relates to fuel cells in which the use of a passive fuel recycle impeller, such as an electrochemical hydrogen pump or an ejector, with a fixed, minimum flow of neat fuel from the fuel source, and a substantially uniform amount of fuel recycle gas to the inlet of (a) a first fuel cell stack of a cascaded pair, or (b) a single stack, with neat inlet fuel being provided to one or more fuel cell stacks, bypassing the recycle impeller, as a function of load on the stacks, produces maximum fuel utilization with minimal fuel recycling.

BACKGROUND ART

As is known, efficiency of a fuel cell power plant begins with the degree to which all of the fuel provided to the power plant is utilized in production of electricity. This is called overall fuel utilization. It is desirable to achieve fuel utilizations in excess of 98%. Providing exactly the amount of fuel which is required for the instantaneous load on the fuel cell power plant cannot be achieved in fuel cells utilizing current technology due to local fuel starvation at various parts of individual cells and among various cells of a fuel cell stack, which in turn is caused by maldistribution of fuel. Maldistribution of fuel to various cells is caused by inadequacies of fuel manifolds, and distribution variations within a given cell are caused by channel depth variations in the fuel flow field. If a multi-pass fuel distribution system is used, in which a portion of all cells receive fuel traveling in one direction through the stack, after which the fuel is turned so that it passes through the other half-portion of all of the cells, variations in leakage at the turn manifold cause maldistribution variations. In vehicular applications, such as fuel cell power plants providing electricity for electric vehicles, the use of two side-by-side fuel cell stacks may provide the best physical fit within the vehicle. In such a case, fuel maldistributions may result from variations in fuel distribution to the respective stacks.

Pass-to-pass leakage variations can be eliminated by using single pass fuel flow field arrangements.

It is known that recycling a large amount of fuel, on the order of 15-25% at maximum power output, will allow an overall power plant fuel utilization which is significantly higher than the utilization in a single pass through the stack. However, the fuel that is recycled typically has to have sufficient pressure to overcome the fuel flow field pressure drop, which requires a pump or compressor of some sort, in the usual case. Due to the low density of hydrogen, positive displacement pumps and centrifugal blowers are typically utilized for significant recycle flows. These are required to operate at very high speeds (in excess of 20,000 rpm), are noisy and are unreliable. Other forms of impellers, such as electrochemical hydrogen pumps and ejectors, have heretofore been incapable of use across a wide range of power output operating conditions.

DISCLOSURE OF INVENTION

Objects of the invention include: eliminating the need of a mechanical fuel recycle gas pump or compressor in fuel cell power plants; providing very high fuel utilization with high reliability in fuel cell power plants; eliminating stack-to-stack fuel maldistribution in fuel cell power plants; reducing the range of performance required of fuel recycle gas impellers; reduced cost fuel cell power plants; and improved fuel cell power plants.

This invention is predicated primarily on recognition of the fact that the maximum utilization of fuel in a fuel cell stack that can be achieved without localized fuel starvation on the fuel cell anodes is lowest at low power levels; consequently, a fixed or modestly varying amount of recycle fuel flow adequate at low power levels will prevent fuel starvation for all power levels without high recycle fuel flows. This invention is predicated on the realization that an electrochemical hydrogen pump will pump only $H_2$, and no inert gases, and that an ejector may be designed with substantially fixed main and secondary flows.

According to the present invention, a fuel cell power plant includes (a) a plurality of fuel cell stacks in serial fuel relationship or (b) a single stack; recycle gas from the fuel outlet of the one stack, or from the last stack of the series, is driven to the fuel inlet of one or more stacks by a passive (non-moving) fuel recycle gas pump, such as an ejector or an electrochemical hydrogen pump; recycle fuel flow sufficient to avoid localized fuel starvation at the lowest power level of the fuel cell power plant is maintained with little or no increase at all power levels (recycle fuel flow at full rated load being less than twice the flow at minimum load), so that the passive fuel recycle pump can be designed to operate in a very small range of performance, avoiding high fuel recycle gas flow rates.

In accordance with one embodiment of the present invention, an ejector is provided to respond to constant pressure, fresh inlet fuel at its primary inlet to drive recycle gas through its secondary inlet into the inlet of at least the first fuel cell stack. The ejector is designed to choke at about the fixed pressure of fuel at its primary inlet, to provide recycle fuel in a range of flows which does not double from the minimum power output of the fuel cell power plant to the full rated power output.

In another embodiment of the invention, an electrochemical hydrogen pump is used instead of an ejector to drive the recycle fuel, causing a substantially constant flow of hydrogen only to the one or more stacks; minimum fresh fuel being controlled by a related pressure regulator.

In either embodiment, the one or more fuel cell stacks respond to related pressure regulators which provide additional fresh inlet fuel as a function of power output above the minimum power load of the fuel cell power plant. In either embodiment the total flow of recycle gas, including fuel and inerts, is substantially constant from minimum power load to maximum power load.

According to the invention further, the flow of additional fresh inlet fuel to the fuel cell stack or stacks to accommodate the power load thereof is controlled by one or more pressure regulators, the controlling pressure of which is at the inlet to the respective stack, such that any additional load on the power plant tends to reduce the related inlet pressure, thereby causing increased flow to the one or more stacks, so as to meet the fuel demand of the load on the power plant; and conversely for decreased load.

While fuel utilizations in the first stack of a cascaded pair of the invention may vary between about 41% at very low power levels to about 93% at 100% of rated power, and fuel utilizations of a second stack of a pair may vary from about 70% at very low power levels to about 93% at rated power, the overall fuel utilization of the fuel cell power plant is about 98% or 99% at any power level.

Since the passive fuel recycle gas pumps can be designed to operate at a substantially constant flow rate to provide recycle fuel, which is between about 18%-33% of the low power fresh fuel flow rate, the low pressure impellers of the invention are relatively inexpensive and extremely reliable, compared with high speed hydrogen fuel recycle gas pumps and compressors known to the prior art.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
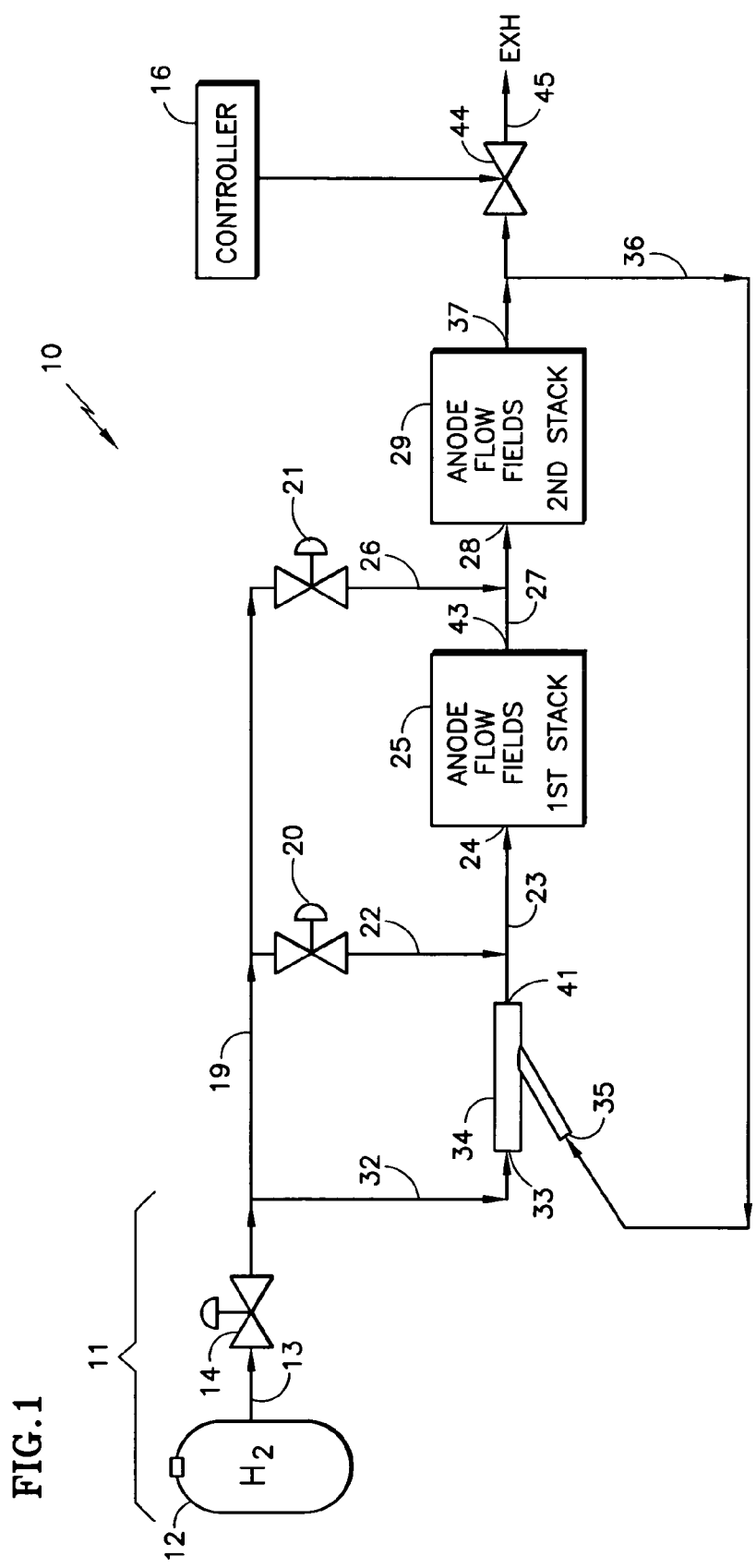
FIG. 1 is a simplified block diagram of an embodiment of the present invention having two fuel cell stacks and utilizing an ejector.

Referring to FIG. 1, hydrogen is provided to a fuel cell power plant 10, only a portion of which is shown, from a source 11 that receives hydrogen from a supply 12, which may be a conventional reformer or a tank of pressurized hydrogen, and passes it through a conduit 13 to a pressure regulator 14. Fuel is delivered from the source 11 over a conduit 19 to a pair of pressure regulators 20, 21. Fuel from the pressure regulator 20 passes over conduits 22, 23 to an inlet 24 of the anode flow fields of a first fuel cell stack 25. Fuel from the pressure regulator 21 passes through conduits 26, 27 to an inlet 28 of the anode flow fields of a second fuel cell stack 29.

According to one aspect of the invention, a fixed amount of fuel is brought from the source 11 over a conduit 32 to a primary inlet 33 of an ejector 34, the secondary inlet 35 of which is connected by a conduit 36 to an outlet 37 of the anode flow fields of the second stack 29, to drive fuel recycle gas through the ejector 41, into the anode flow field inlet 24 of the first stack 25. Fuel from the outlet 43 of the anode flow fields of the second stack 29 also passes through a valve 44 which is controlled by a controller 16 to provide the proper amount of purge gas on an exhaust line 45, thereby to eliminate inert gases, such as nitrogen, which crosses over from air in the cathode, through the porous membrane electrolyte of the fuel cell stacks. The controller 16 may operate the purge valve 44 on a pulse-width-modulation basis: for instance, opening the valve every 5 seconds and closing it after a short time which increases with increased power output.

The pressure regulators 20, 21 adjust the flows to the two fuel cell stacks so that at rated power, both fuel cell stacks get the same amount of fuel, including the flow of fresh and recycle fuel through the ejector to the first stack and the flow of exit fuel from the first stack to the second stack. The pressure regulator 14 provides hydrogen at its output at about 200 kPag (30 psig). The pressure regulators 20, 21 provide hydrogen at about 18 kPag (2.6 psig) and at about 16 kPag (2.3 psig), respectively.

The ejector 34 is designed to choke at a flow rate which results from flow at the pressure of fuel at the outlet of the pressure regulator 14. Whenever the load on the fuel cell stack increases, additional hydrogen is consumed causing the pressure of hydrogen in the conduits 23, 27 to decrease, which is communicated through the conduits 22, 26 to the pressure regulators 20, 21, which open somewhat to provide more fuel. The additional fuel, however, does not pass through the ejector 34, but rather passes along the conduit 19, through the pressure regulators 20, 21 and conduits 22, 23, 26, 27 to the inlets 24, 28 of the anode flow fields of the stacks 25, 29.

Similarly, a reduction in the load on the fuel cell power plant will cause less hydrogen to be consumed, so the pressure of hydrogen in the conduits 23, 27 will increase, which is communicated to the pressure regulators 20, 21, causing them to close somewhat and reduce the amount of hydrogen provided to the conduits 19, 22, 23, 26, 27.

At minimum power, the pressure regulators 20, 21 are closed; all flow of fresh fuel into the fuel cell power plant is through the primary inlet 33 of the ejector 34; all fuel to the second stack 29 comes from the first stack outlet 43. The ejector is designed to provide, with the minimum fuel flow at its primary inlet 33, sufficient recycle fuel through its secondary inlet 35 so that the total fuel flow through the stacks 25, 29 will avoid fuel starvation.

Series fuel flow from stack-to-stack is an ideal way to maximize fuel utilization. However, without some amount of by-pass flow around the first stack in a series stack configuration, such as the pressure regulator 21 and conduit 26, higher first-stack inlet pressures are required. The higher pressures require that the recycle pumps must deliver their required flow at higher pressures. This means these pumps consume more parasitic power. Additionally, the resulting higher first-stack inlet flow rates can increase the likelihood of inlet membrane dryout at the fuel inlet resulting in membrane degradation. However, the invention may be employed in a fuel cell power plant having a plurality of stacks in serial fuel flow relationship with all fresh fuel being fed only into the first stack (e.g., no fuel bypass).

Figure 2:
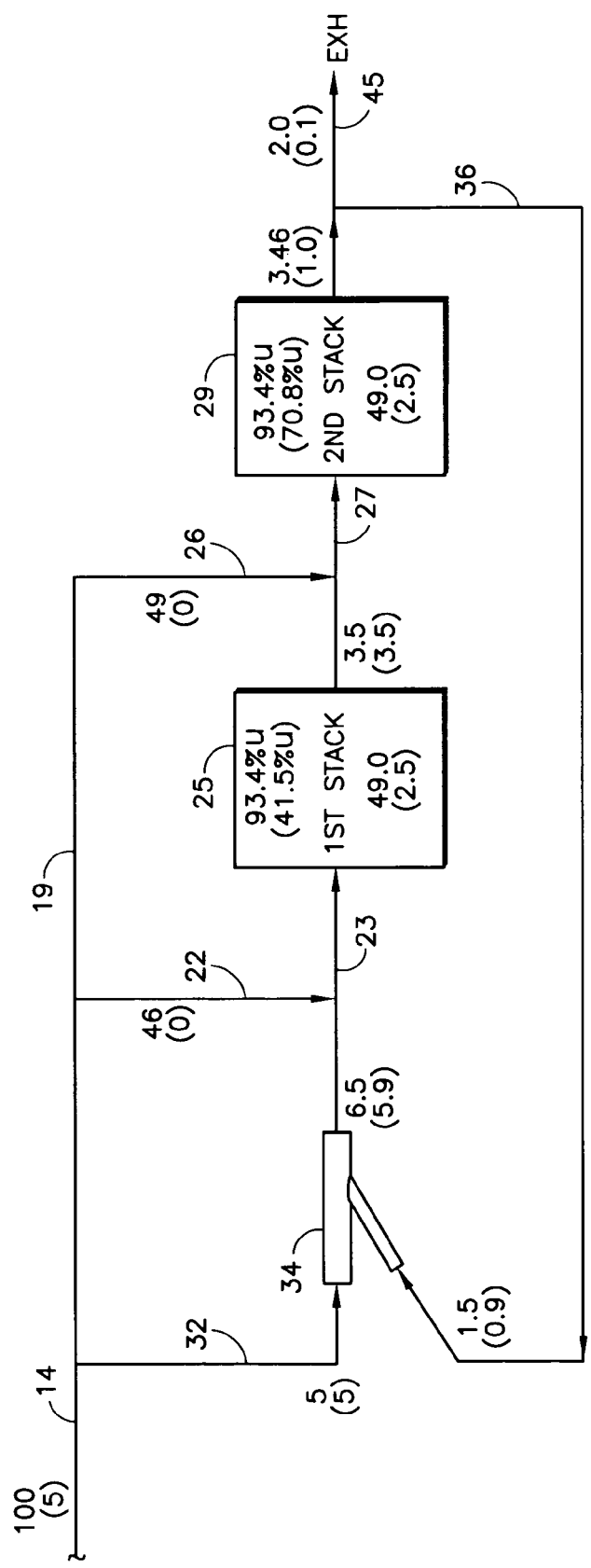
FIG. 2 is a stylized version of FIG. 1 showing moles of fuel flow and fuel consumed per 100 moles of fresh $H_2$ provided at full power and per 5 moles of fresh $H_2$ provided at minimum power, and stack fuel utilization, for 5% rated power and 100% rated power.

FIG. 2 illustrates fuel flow in the various conduits, in moles, fuel consumption, in moles, and fuel utilization, percent. FIG. 2 assumes that at 100% of rated power, 100 moles of fresh hydrogen will be provided and that at 5% of rated power, 5 moles of fresh hydrogen will be provided. This, of course, is simply illustrative of the fractional flows and consumptions. Operation of the fuel cell power plant of FIGS. 1 and 2 achieves about 98%-99% fuel utilization at any power level.

In FIG. 2, the approximate number of moles of fuel (excluding inerts) is shown for 100% of rated power (not in parentheses) above the moles of fuel at 5% of rated power (shown within parentheses). At the top of each stack is the individual stack fuel utilization for 100% rated power (no parentheses) and for 5% rated power (within parentheses). At the bottom of each stack is the moles of fuel consumed at full rated power (no parentheses) and at 5% rated power (within parentheses). Note that the maximum flow of recycle fuel is less than twice the minimum flow of recycle fuel when an ejector is used. The increase in recycle fuel gas flow at higher power levels is due to reduced concentration of inert gases in the total recycle flow at this operating condition; the total flow of recycle gas is substantially constant from minimum power load to maximum power load.

Figure 3:
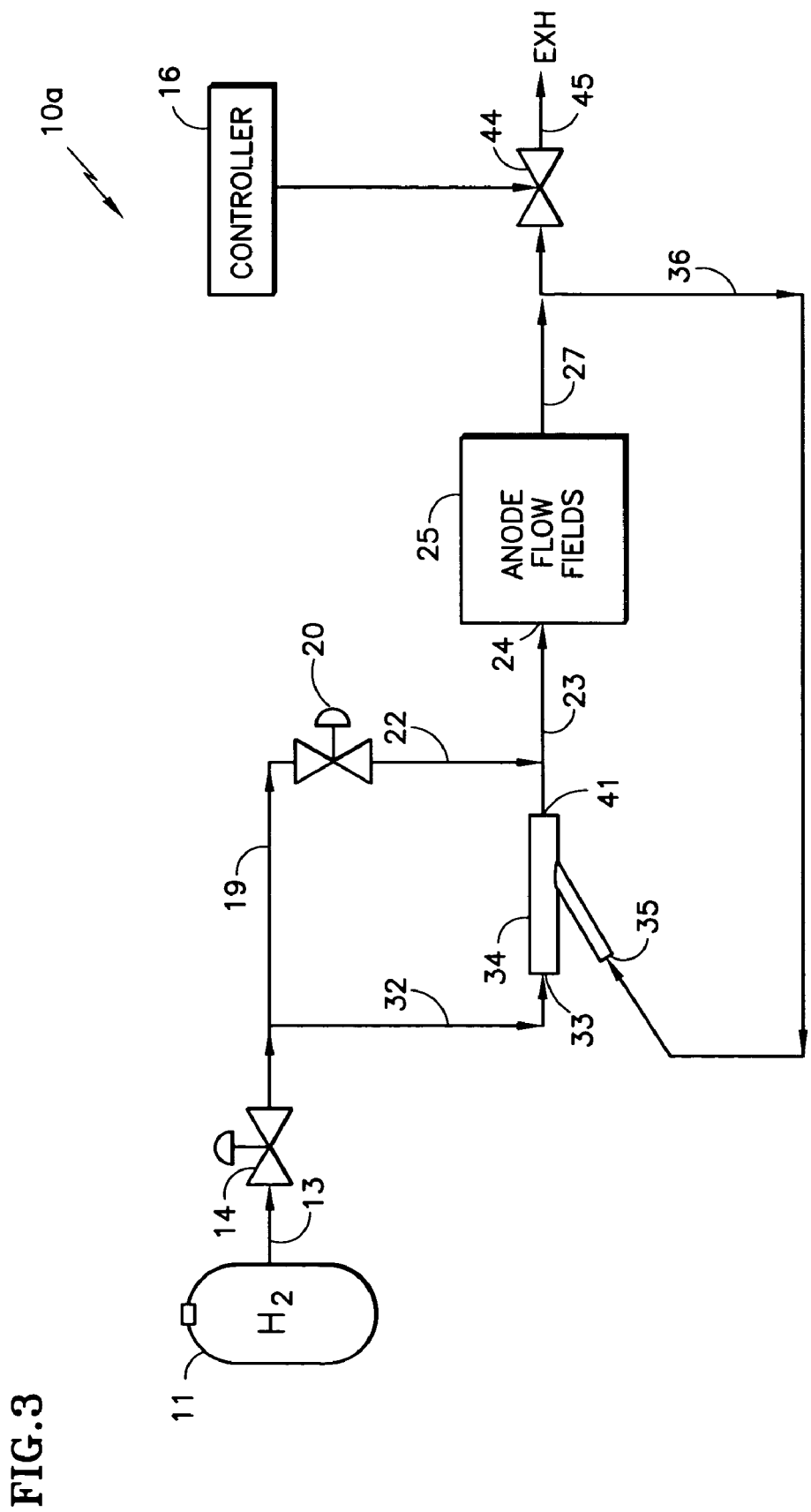
FIG. 3 is a simplified block diagram of an embodiment of the present invention having one fuel cell stack and utilizing an ejector.

Referring to FIG. 3, the present invention may be utilized with a single stack of fuel cells, in the same fashion as with the pair of fuel cells described with respect to FIG. 1.

Figure 4:
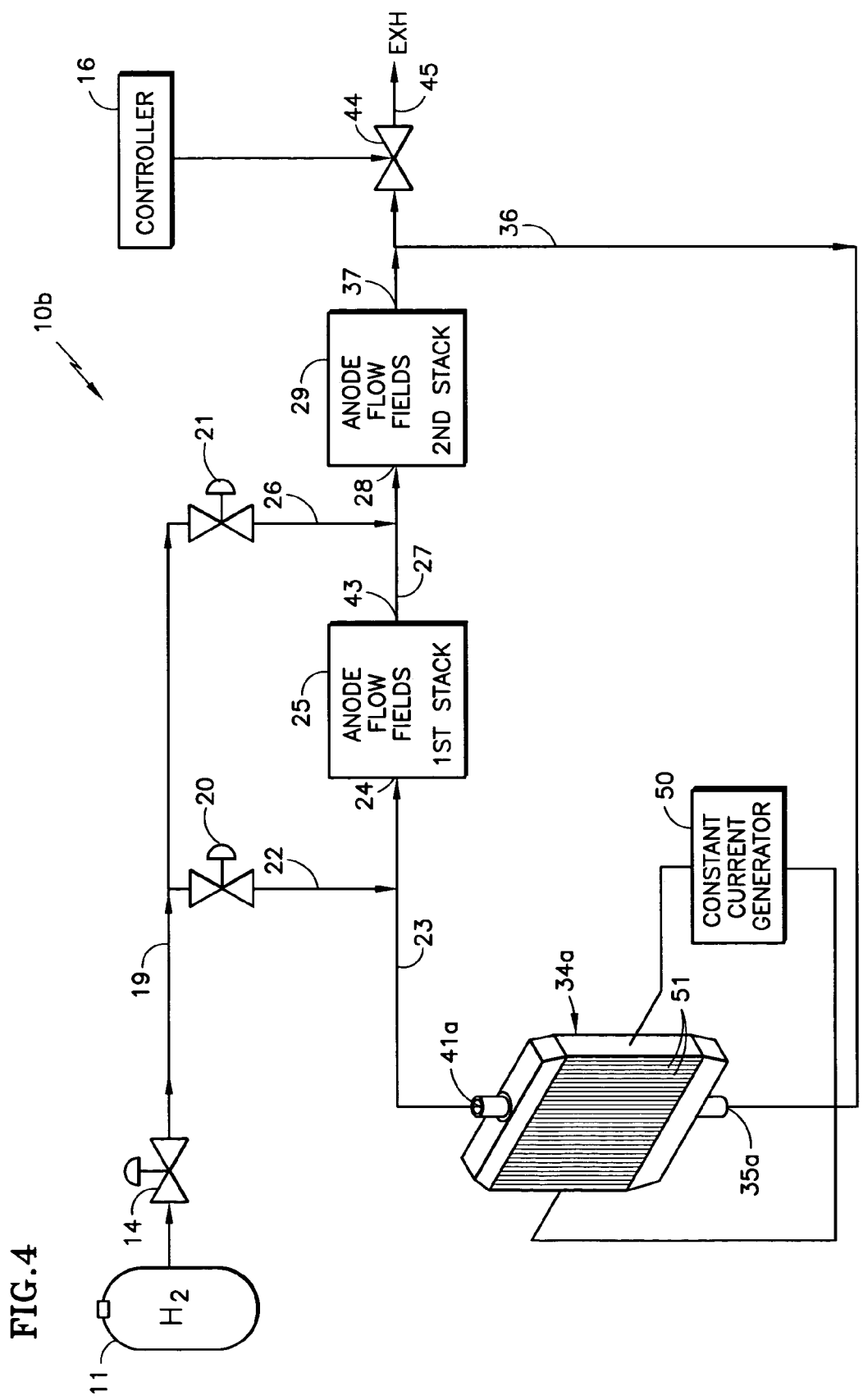
FIG. 4 is a simplified block diagram of an embodiment of the invention employing an electrochemical hydrogen pump.

Referring to FIG. 4, a fuel cell power plant 10b is the same as that described with respect to FIG. 1, except that the passive fuel recycle gas pump 34a is a conventional electrochemical hydrogen pump, rather than an ejector. This will pump only hydrogen, and will not pump any inert gases. Since the recycle flow is essentially pure hydrogen, the amount of recycle gas may be lower than it would be if the recycle gas included inerts, and it may be essentially constant. A constant current generator 50 connected across cells 51 of the pump 34a causes the hydrogen to have a higher pressure at the outlet 41a than it has at the inlet 35a. Use of the hydrogen pump is advantageous because the amount of fuel recycle gas does not vary as long as the current applied to the pump is constant, and this will provide overall utilization of 98%-99%, with the invention. Since the current across the hydrogen pump is nearly constant, the recycle hydrogen flow is essentially constant.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of operating a fuel cell power plant which comprises providing a flow of fuel recycle gas having a substantially constant quantity of recycle fuel therein at all levels of power output, said flow of fuel recycle gas having a sufficient quantity of recycle fuel therein at a minimum level of power output to avoid fuel starvation within said fuel cell power plant at said minimum level of power output.

2. A method of operating a fuel cell power plant, comprising:
providing a minimal flow of fresh fuel from a source to said fuel cell power plant at a minimum power output level; end
providing a flow of recycle fuel gas which is substantially constant at all levels of power output of said fuel cell stack, said flow including sufficient recycle fuel gas at said minimum power output level to prevent, together with said minimal flow of fresh fuel, fuel starvation within said power plant.

3. A fuel cell power plant, comprising:
a source of fuel providing a minimal flow of fresh fuel to said fuel cell power plant at a minimum power output level; and
means providing a flaw of fuel recycle gas which is substantially constant at all levels of power output of said fuel cell stack, said flow including sufficient recycle fuel at said minimum power output level to prevent, together with said minimal flow of fresh fuel, fuel starvation within said power plant.

4. A power plant according to claim 3 wherein:
said means providing a flow of fuel recycle gas comprises an ejector designed to choke at the pressure of fuel provided by said source with a flow rate of combined fresh fuel from said source and recycle fuel to satisfy the fuel requirement of said fuel cell power plant at said minimum power output level.

5. A power plant according to claim 3 wherein:
said means providing a flow of fuel recycle gas comprises an electrochemical hydrogen pump with a constant current generator providing current across said electrochemical hydrogen pump of a magnitude to provide said sufficient quantity of recycle fuel gas flow.

6. A fuel cell power plant operable at power output levels between a full rated power output level and a minimum power output level, comprising:
a plurality of fuel cells, each having a fuel inlet and a fuel outlet, said fuel cells arranged in one or more stacks selected from (a) one stack comprising the first and last stack in said fuel cell power plant or (b) a series of stacks arranged in serial fuel flow relationship such that every stack except a last stack in said series provides fuel to a stack next subsequent thereto in said series, and every stack except a first stack in said series receives fuel from a next preceding one of said stacks in said series, each stack having a fuel inlet and a fuel outlet;
a source of fuel for providing fresh fuel to the fuel inlet of at least one of said stacks; and
a passive fuel recycle gas pump providing recycle fuel gas flow from the fuel outlet of at least one of said stacks to the fuel inlet of one or more of said stacks in substantially constant quantity, at all of said power output levels, said substantially constant quantity being sufficient to prevent fuel starvation of said fuel cells when operating near maximum fuel utilization at minimum power.

7. A power plant according to claim 6 wherein:
said passive fuel recycle gas pump is an ejector with its primary inlet connected to said source, its secondary inlet connected to said fuel outlet of at least one of said stacks, and its outlet connected to said fuel inlet of at least one of said stacks, and is designed to choke at the pressure of fuel provided by said source with a flow rate of combined fresh fuel from said source and recycle fuel to satisfy the fuel requirement of said one or more stacks at said minimum power output level.

8. A power plant according to claim 7 further comprising:
at least one pressure regulator, the output of each pressure regulator feeding the fuel inlet of a corresponding stack, each pressure regulator providing substantially no fuel to any of said one or more of said stacks at said minimum power output level and providing all fuel required to satisfy the fuel requirement of said one or more stacks at power output levels above said minimum power output level in excess of the fuel required to satisfy the fuel requirement at said minimum power output level.

9. A power plant according to claim 6 wherein:
said passive fuel recycle gas pump is an electrochemical hydrogen pump, connected between said fuel outlet of at least one of said stacks and said fuel inlet of at least one of said stacks, with a constant current generator providing current across said electrochemical hydrogen pump of a magnitude to provide said sufficient quantity of recycle fuel gas flow.

10. A power plant according to claim 9 further comprising:
at least one pressure regulator, the output of each said pressure regulator feeding the fuel inlet of a corresponding stack, one of said pressure regulators connected to said first stack and providing to said first stack, at said minimum power output level, sufficient fuel to satisfy, when combined with said recycle fuel gas, the fuel requirement of said one or more stacks at said minimum power output level.

11. A power plant according to claim 10 wherein:
there is a series of fuel cells arranged in said serial fuel flow relationship; and
any of said stacks other than said first stack is provided no fuel by a corresponding one of said pressure regulators at said minimum power output level.

12. A power plant according to claim 10 wherein:
at power output levels other than said minimum power output level, all of the fresh fuel requirement of said one or more stacks in excess of that required at said minimum power level is provided by said pressure regulators.

13. A power plant according to claim 6 wherein:
there is only one stack.

14. A power plant according to claim 6 wherein:
there are two stacks.

* * * * *